United States Patent [19]

Maeda et al.

[11] 4,396,164
[45] Aug. 2, 1983

[54] EASY LOADING MECHANISM FOR CAMERAS

[75] Inventors: Keisuke Maeda; Akira Yamanaka, both of Sakai, Japan

[73] Assignee: Minolta Camera Kabushiki Kaisha, Osaka, Japan

[21] Appl. No.: 252,651

[22] Filed: Apr. 9, 1981

[30] Foreign Application Priority Data

Apr. 11, 1980 [JP] Japan .................................. 55-48487
Apr. 22, 1980 [JP] Japan .................................. 55-53816

[51] Int. Cl.³ ........................ B65H 75/28; G03B 1/24
[52] U.S. Cl. .................................... 242/74.1; 354/212
[58] Field of Search ................... 242/74.1, 71, 74.2, 242/74, 71.2, 71.1, 71.4; 354/212, 215

[56] References Cited

U.S. PATENT DOCUMENTS

| | | | |
|---|---|---|---|
| 3,377,935 | 4/1968 | Furusawa | 354/212 |
| 3,377,936 | 4/1968 | Goshima | 354/212 |
| 3,420,154 | 1/1969 | Lieser | 242/74 X |
| 3,885,750 | 5/1975 | Ikeuchi | 242/74 |
| 4,239,362 | 12/1980 | Katayama | 242/74 |

FOREIGN PATENT DOCUMENTS 42-22324 12/1967 Japan .
44-16294  7/1969 Japan .................................. 354/212
53-139843 11/1978 Japan .................................. 354/212

*Primary Examiner*—Edward J. McCarthy
*Assistant Examiner*—Lloyd D. Doigan
*Attorney, Agent, or Firm*—Wolder, Gross & Yavner

[57] ABSTRACT

A camera film easy loading takeup spool includes a body member rotatable about a longitudinal axis past a film delivery position and a plurality of peripherally spaced pairs of longitudinal jaw members, one of each of which is swingable about a longitudinal axis between film entry opening open and closed positions relative to the respective other jaw member and spring biased to its open position and including a depending follower engaging a circular cam which closes the jaws offset from the film delivery position and permits the spring opening of the jaw proximate the film delivery position. A film perforation engaging tooth or a friction pad is carried by one of each pair of jaws and the inner ends of the jaws delineate an inner passageway of a width equal to about the film thickness. A visual indicator is actuated when any one of the jaw members is open.

20 Claims, 10 Drawing Figures

EASY LOADING MECHANISM FOR CAMERAS

BACKGROUND OF THE INVENTION

The present invention relates generally to improvements in cameras and it relates particularly to an improved camera film loading mechanism.

The most common type of conventional camera film easy loading mechanism is equipped with a film takeup spool provided with a takeup claw or claws located proximate the film insertion path traversed by the leader of the roll film, a takeup claw engaging the film to roll it up on the spool. However, this type of film takeup spool is provided with an extremely narrow film insertion slit along the insertion path, the width of the slit being slightly larger than the thickness of a film. This makes it difficult to insert the film leader into and along the film insertion path, resulting in a very awkward and troublesome film loading operation.

There have been proposed a wide variety of film loading mechanisms for eliminating the defects of the earlier mechanisms. Most of these mechanisms include rotatable or swingable flap members provided on the spool body so that the film leader is automatically engaged by the flap members to be taken up on the spool body, as described, for example, in U.S. Pat. No. 3,337,935, Japanese Utility Model Publication No. 44-16294, and Japanese Utility Model Laid Open Publication No. 53-139843. All of these film loading mechanisms require that the film leader be within the rotatable path of the flap members. Due to film curl or a difference in flexibility between the various films employed, however, the film leader often deviates from the rotatable path of the flap members even though initially set therein, thereby resulting in a film loading failure.

SUMMARY OF THE INVENTION

It is a principal object of the present invention to provide an improved film loading mechanism in a camera.

Another object of the present invention is to provide an improved camera film takeup spool.

Still another object of the present invention is to provide an improved easy loading mechanism which permits highly reliable, simple and rapid operation and accurate film loading at all times, regardless of film curl or differences in flexibility between the films used.

The above and further objects of the present invention will become apparent from a reading of the following description taken in conjunction with the accompanying drawings which illustrate preferred embodiments thereof.

A film takeup spool in accordance with the present invention comprises a body member rotatable about a longitudinal axis past a predetermined film delivery position and including a pair of jaw members having confronting faces delineating a film passageway, at least a first of the jaw members being swingable about a longitudinal axis relative to the other jaw member between an open position providing a relatively wide entry opening to said film passageway and a closed position providing a relatively narrow entry opening and means responsive to the positioning of said entry opening away from said predetermined position for shifting said first jaw member to its closed position and responsive to the positioning of said entry opening proximate said predetermined position for releasing said first jaw member for shifting to its open position.

In the preferred form of the improved spool a plurality of peripherally spaced pairs of jaw members are provided, the first jaw members being swingable about respective longitudinal axes between open and closed positions and each being spring biased to its open position and the cooperating other jaw members being stationary. One of each pair of jaw members includes a friction rubber pad or a film perforation engaging tooth facing the other jaw member and the means for closing the first jaw members including circular cam engaging followers depending from the first jaw members. Visual indicating means are provided for indicating the retracted or closed condition of all the jaw members. Advantageously, the inner portions of the film passageways are of widths slightly less than the film thickness.

The improved film takeup spool can be easily, quickly, precisely and reliably loaded, and is of simple and rugged construction and of great versatility and adaptability.

DESCRIPTION OF THE PREFERRED EMBODIMENT

Figure 1:
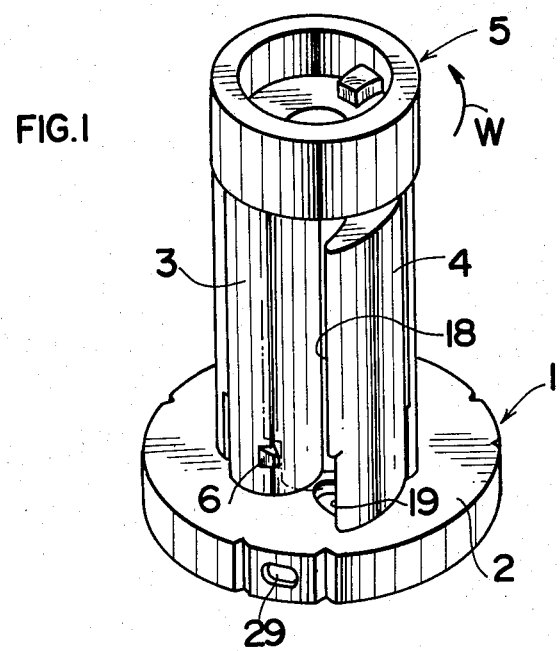
FIG. 1 is a perspective view of a preferred embodiment of the present invention.

Referring now to the drawings, particularly FIGS. 1 to 7 thereof, which illustrate a preferred embodiment of the present invention, the reference numeral 1 generally designates the body of the improved takeup spool which includes a circular base 2, having integrally formed therewith a plurality of, for example, three circularly spaced vertical supports 3 of curved, tapered, transverse cross-section and a similar member of peripherally spaced vertical flaps 4 of air-foil shape transverse cross-section pivoted at its bottom for rotation about vertical axes at a predetermined angle. Supports 3 and flaps 4 form a takeup drum, around which a film is wound. An axial driven member 5 is rotated in a counterclockwise direction as shown by arrow W, by a film advance mechanism (not shown) and is connected to the spool body for integral rotation therewith.

Figure 2:
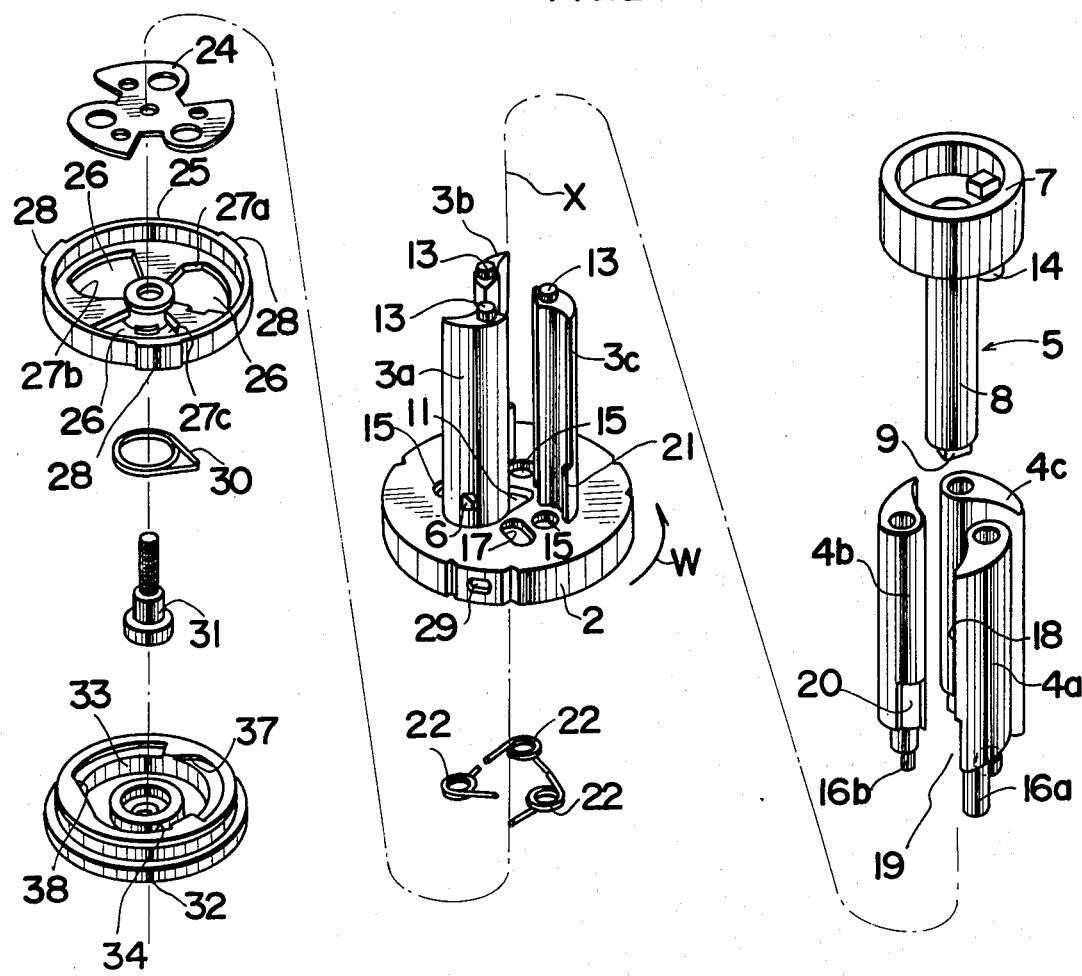
FIG. 2 is an exploded perspective view thereof.

As illustrated in FIG. 2, spool body 1 consists of a molded plastic unit or component, which includes base plate 2 and the three circumferentially spaced posts or supports 3a, 3b and 3c integral therewith. Supports 3a, 3b and 3c are each of the shape of a curved piece, and a takeup tooth or claw 6 engageable with a film perforation is formed on the lower border of the curved surface of each support 3 and projects in the rotational direction of the spool body (in the direction of arrow W). Member 5 includes a cup shaped upper enlarged shaft head 7 coupled to a film advance mechanism (not shown) and an axial shaft 8. A triangular projection 9 integrally coaxially depending from shaft 8 matingly engages a hole 11 of a similar shape thereto formed in the center of base plate 2. Coupling wells 12 formed in the bottom face of shaft head 7 (as shown in FIG. 3) receive respective mating pins 13 formed atop each support 3 for connection to base plate 2, which is rotated integrally with driven member 5 when the latter is rotated.

It should be noted that although three each of coupling well 12 and pin 13 are provided, the single reference numbers are used for convenience of description. It is also true in the following description that the single reference numbers may be used for parts or members related to support 3 and flap 4 in the drawings, unless otherwise specifically stated, or either part or member alone may be used as representative. As is clear from the drawings and the description of the embodiments, however, three each of such part or member are actually provided therein.

Figure 3:
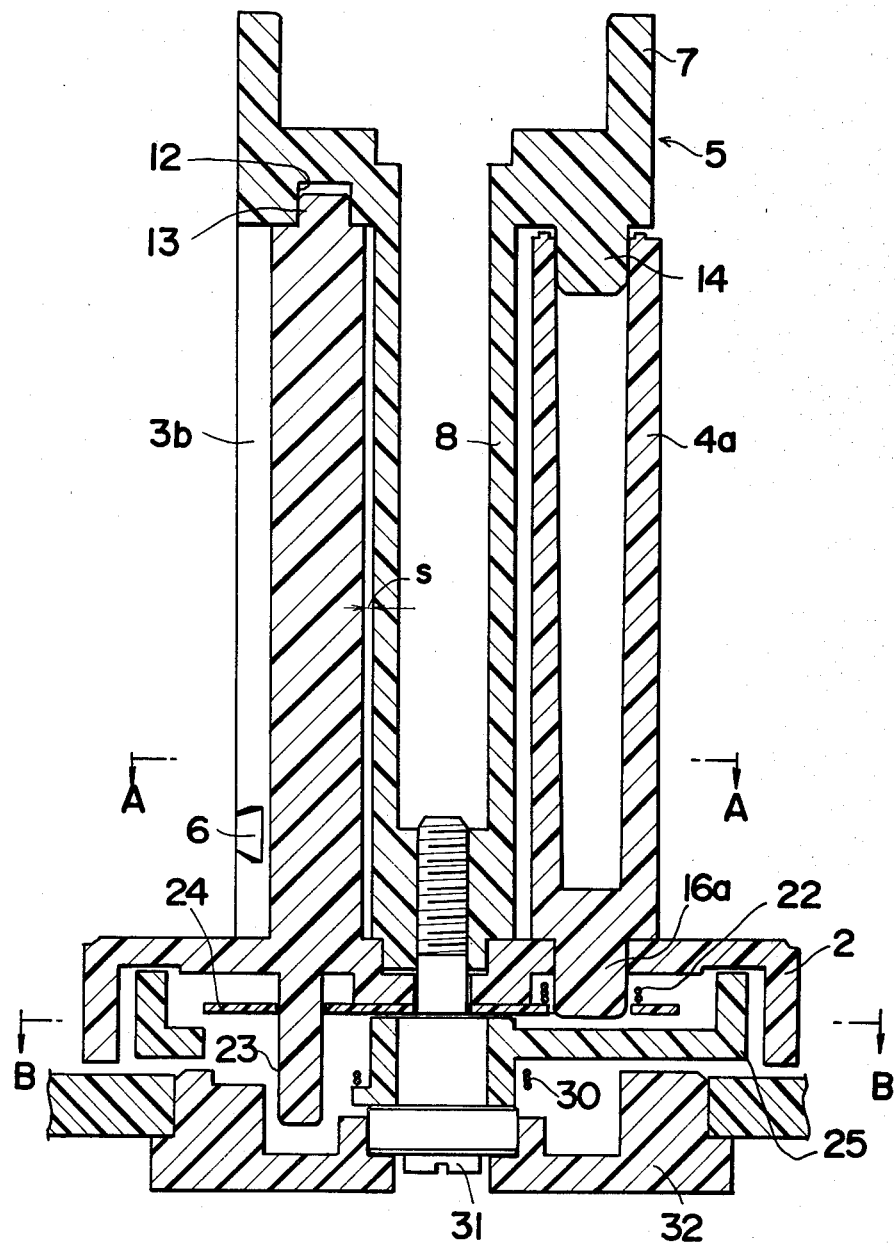
FIG. 3 is a medial longitudinal sectional view thereof.
Figure 4:
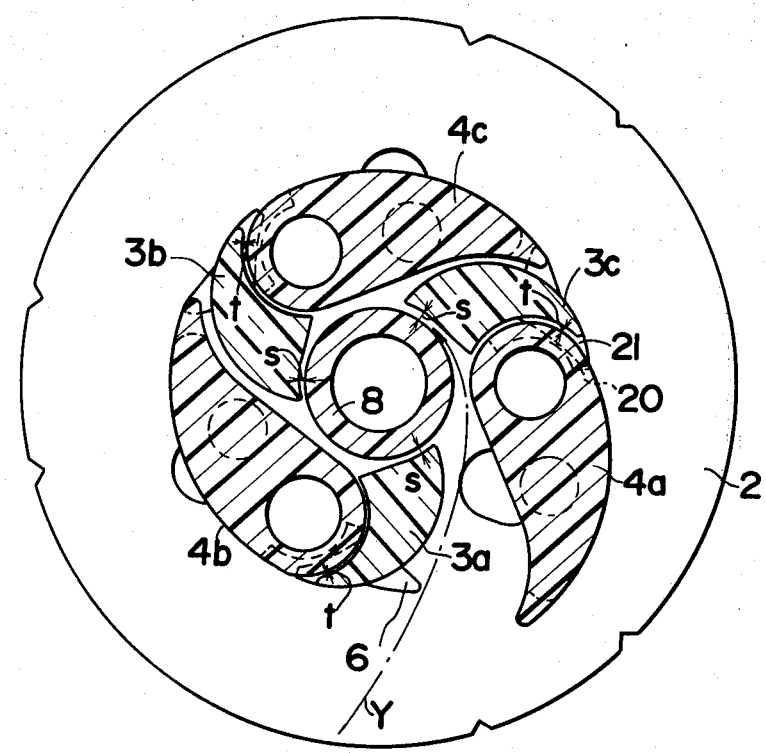
FIG. 4 is a cross-sectional view taken along line A—A in FIG. 3.

As best seen in FIGS. 3 and 4, the clearance S between center shaft 8 of the driven member and the confronting inner end faces of supports 3a, 3b and 3c is almost as wide as the film thickness.

Figure 5:
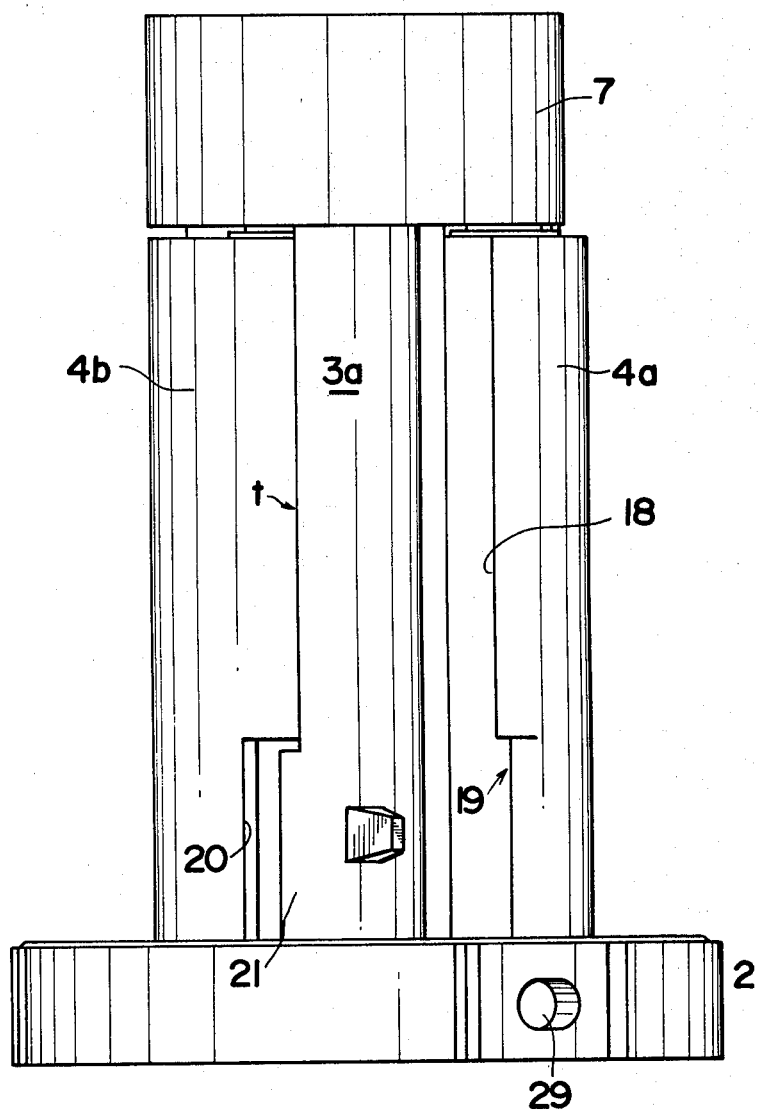
FIG. 5 is a side view of the device of FIG. 1.

When inserted into clearance S, a film leader is caught between the center shaft and a proximate support. Flaps 4a, 4b and 4c interdigitate or are disposed between respective 3 supports, and are retained rotatable around respective vertical axes parallel to the rotation axis X of the spool body by shaft pins 14 (one of the pins being shown in FIG. 2) depending from the bottom of shaft head 7 of driven member 5 and bearing holes 15 formed in base plate 2. Each flap 4 is movable between an open position where the space or distance from the side of support 3 is relatively wide and a closed position where the space therefrom is relatively small or nonexistant with the flap in contact with the support. Control pins 16a, 16b and 16c depend from the bottoms of flap 4 and extend through respective arcuate slits 17 formed in base plate 2. A recessed or cut portion 19 is formed on the lower part of the movable end 18 of each flap 4 to prevent the flap from striking a respective takeup claw 6 formed on the adjacent support when the flap is shifted to its closed position shown by the phantom line in FIG. 1. Furthermore, a recess 20 is formed in the lower part of the opposite end of each flap 4, i.e., a portion opposed to the next support in the rotational direction as shown in FIGS. 4 and 5, and a stepped portion 21 of a shape fittable into a recess 20 is integrally formed on the support opposed to each recess, and the clearance or entrance t formed between the flap and the support is sharply angled or bent at the position where the stepped portion engages a respective recess.

It should be noted that flaps 4a, 4b and 4c, like support 3, are curved pieces, and their convex outer faces in the rotational direction of spool body 1 constitute a cylindrical circumferential surface together with the supports when the flaps are at their closed position, thereby forming part of a takeup drum on which a film is wound. The concave surfaces at the inside or rear are formed so that they function as a guide surface to lead a film along or through clearance S between center shaft 8 and a support 3 when the film is inserted. In additon, the film insertion path Y of an inserted film is delineated by one face defined by the concave surface of a flap and the inner end surface of a support 3 opposed to center shaft 8, and the other face defined by the convex surface of a respective trailing support 3 and the peripheral surface of center shaft 8.

Figure 6:
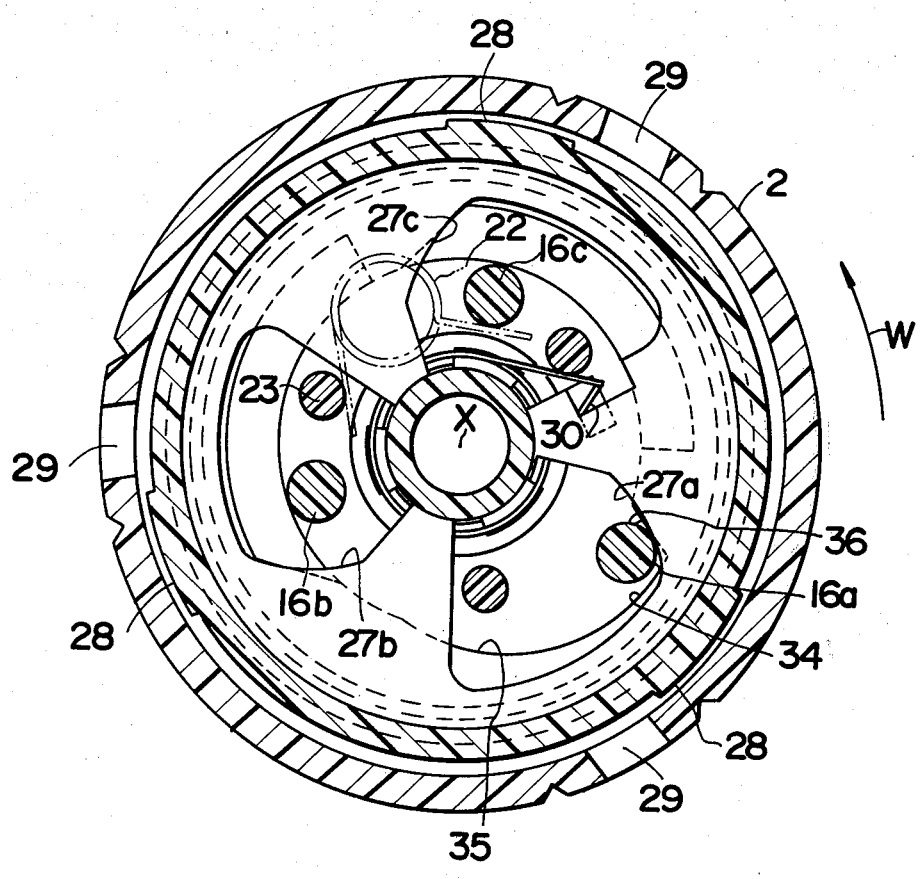
FIG. 6 is a cross-sectional view taken along line B—B in FIG. 3.
Figure 7:
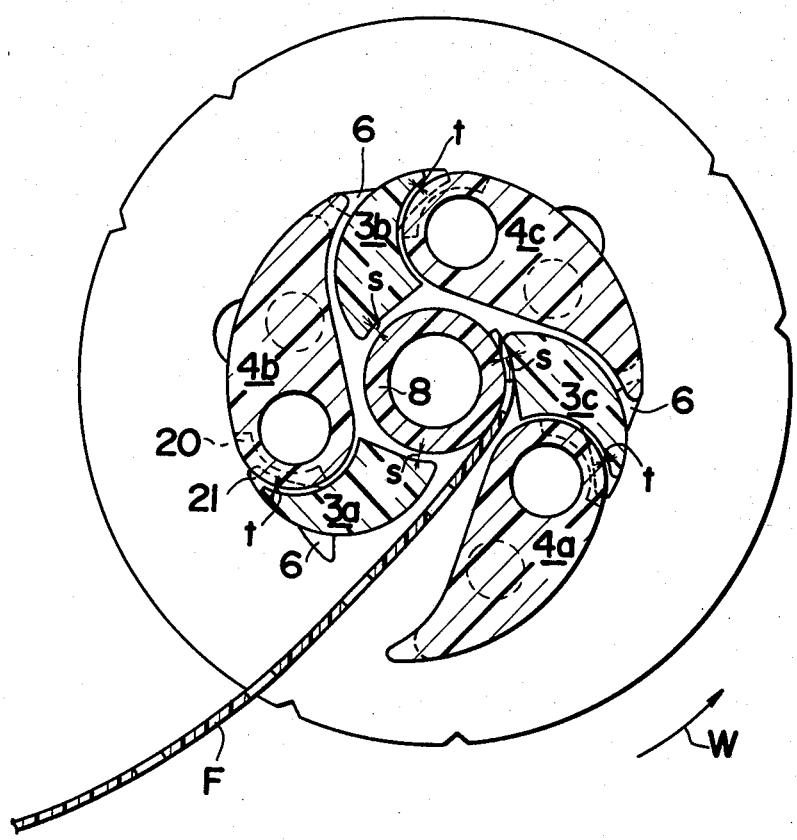
FIG. 7 is a cross-sectional view similar to FIG. 4 but showing a film in a loaded position.

Provided at the rear face of base plate 2 on spool body 1 are three springs 22 as shown in FIG. 6, one end of each of which engages a respective pin 23 depending from base plate 2 and the other end of each of which engage a control pin 16a, 16b and 16c depending from a respective flap and extending through a respective arcuate slit 17, whereby each flap 4 is biased to its advanced position away from the support 3, i.e., towards its open position. A keeper plate 24 prevents the separation of springs 22 from base plate 2, and a circular takeup indicating member 25 has sector shaped holes 26, through which respective pins 23 depending from base plate 2 and the control pins depending from flaps 4 project. As shown in FIG. 6, cams 27a, 27b and 27c are formed along one of the radial extending edges of each hole 26, and control pins 16a, 16b and 16c engage respective cams when respective flaps 4 are in their open position. In addition, formed on the circumference of takeup indicating member 25 are three indicators 28 colored bright red, yellow and white, which are visible through indicating windows 29 located on the peripheral surface of base plate 2 when takeup indicating member 25 is positioned at a predetermined angular position relative to base plate 2. A spring 30 biases takeup indicating member 25 in the clockwise direction about the rotational axis X of spool body 1. A set screw 31 extends through and secures spring 30, takeup indicating member 25 and keeper plate 24 to center shaft 8 of driven member 5.

A control member 32 is fixed to the camera body (not shown) and a peripheral cam track or groove 33 is formed on control member 32. Control pins 16a, 16b and 16c extend through takeup indicating member 25 and engage cam groove 33, abutting against the peripheral surface thereof. Formed in the circumferential surface of cam groove 33 are recess 34 greatly recessed radially from rotational axis X of spool body 1, open control cam 35 for guiding the control pins into recess 34 and close control cam 36 for pushing the control pins out of recess 34, as shown in FIG. 6. It is to be noted that control member 32 is disposed relative to the camera body (not shown) so that recess 34 faces toward the opening of a film takeup chamber in the camera body, i.e., positioned to face the rear cover for opening and closing the film takeup chamber.

Considering now the operation of the camera takeup spool described above, the loading of the camera with a film may require the leader film F to be drawn from the film patrone and inserted into one of the film insertion paths or throats formed on the film takeup spool. As shown in FIG. 6, control pin 16a of the three control pins is located in recess 34 formed on cam track 33 of the control member, whereby the film takeup spool positions flap 4a integrally formed with control pin 16a in its open position. Recess 34, being formed at a position facing toward the rear cover of the camera, causes flap 4a positioned at the opening of the film takeup chamber, i.e., a flap exposed when the rear cover is opened, to be shifted to its open position. In additon, with the flap at its open position, its swingable or free end is greatly spaced from the respective support 3 of spool body 1 to effect the maximum width of the opening or entrance of film insertion path Y (as shown in FIG. 4), thereby allowing the film leader F to be easily inserted and advanced along film insertion path Y during film loading. The film leader F thus inserted into the film insertion path Y is guided along the concave surface of the flap 4a to reach clearance S formed on the innermost part of the film insertion pth, and is held between center shaft 8 and support 3c, which delineate clearance S (see FIG. 7). With the film advanced under this condition, driven member 5 is rotated counterclockwise through a drive coupled mechanism (not shown). With driven member 5 rotated, spool body 1 and flaps 4a, 4b and 4c are rotated integrally therewith in the same direction, that of arrow W. In contrast, however, control member 32 is fixed to the camera body, causing its position relative to spool body 1 to be angularly shifted, whereby flap 4a, initially at its open position, is positively moved to its closed position. That is, control pin 16a of flap 4a abuts against recess 34 of control member 32 before the film advance operation, as shown in FIG. 6, However, in response to the film advance operation, control pin 16a starts moving counterclockwise in the direction of arrow W, and at the initial stage of its shift, control pin 16a is pushed out of recess 34 under the action of close control cam section 36, thereby shifting it in an inward direction toward the rotational axis X of the spool body. As a result, flap 4a initially at its open position is rapidly transferred or shifted to its closed position, thereby closing the opening or entrance of film insertion path Y. On the other hand, the film inserted into path Y is somewhat curved along the outer circumferential convex surface of succeeding support 3a as the spool body is rotated, and in additon, is pressed by flap 4a which is shifted to its closed position, thereby engaging the convex surface of the support 3. When a perforation of the film is positioned to match takeup claw 6, the takeup claw 6 automatically engages such perforation, whereby the film is caught by takeup claw 6 to ensure accurate film advance, even if the film leader should be removed from clearance S during film advance operation. Furthermore, under this condition, the free end 18 of flap 4a in its closed position is, as shown by phantom line in FIG. 1, located above takeup claw 6 engaging the film perforation to overlie the film, thereby preventing the film from being removed from the takeup claw 6 once engaging the perforation.

When a film perforation is not positioned to match a takeup claw 6 at the initial stage of film advance, the film will be slightly shifted in the direction of withdrawal from the spool body to automatically engage takeup claw 6 as the film advance operation progresses. This is due to the film advance rate by the spool body being generally greater than the film advance rate by the conventionally associated sprocket (not shown), since the diameter of the spool is larger than that of the sprocket, although spool and sprocket are rotated at the same angular speed upon the film advance operation.

Thus, the length of the film drawn from the spool body corresponds to the difference in advance length between the two. As described earlier, however, the film is pressed by flap 4a shifted to the closed position against succeeding support 3a, causing takeup claw 6 to engage the film perforation as the film is drawn from the spool body, i.e., the moment the film perforation is shifted to the position of takeup claw 6. The spool body thereafter takes up the film, with takeup claw 6 in engagement with the film. Moreover, if the film drawing force is increased when takeup claw 6 engages the film perforation, the drawing force only stops the spool itself from rotating since the film and the spool are firmly intercoupled, as described above. Generally, moreover, there is a friction clutch provided between the spool body and the film advance drive system, so that the spool body may slip relative to the film advance drive system when a large load is applied to the former. As a result, the force acting to reverse the spool rotation is completely absorbed by the first friction clutch. Consequently, the film and the spool component parts are neither broken nor damaged, even if an excessive force occurs in drawing the film out from the spool body.

Thus, the film once inserted in the film insertion path Y engages takeup claw 6 as the film advance operation progresses, and is reliably taken up on the spool.

It should be noted that control pin 16b of succeeding flap 4b reaches open control cam 35 from the condition shown in FIG. 6 during the film advance operation to allow flap 4b to be resiliently spring urged from its closed position to its open position. At this time, however, since the film has already been to some extent wound around the takeup drum of the spool body, succeeding flap 4b is pressed by the film to its closed position, thereby preventing flap 4b to shift to its open position.

In the meantime, when control pin 16a of flap 4a is shifted inward, in the direction approaching the rotational axis X of the spool body, under the action of close control cam 36 at the initial stage of the film advance operation, as described above, takeup indicating member 25, which has been maintained in a retracted position as shown in FIG. 6 with cam edge 27a pushed by control pin 16a, is released from its retracted pressed condition and is rotated clockwise a predetermined angle under the action of spring 30, whereby indicator 28 formed on the circumference of takeup indicating member 25 is moved into registry with an indicating hole 29 on base plate 2 of the spool body. When the film is positively connected to and taken up on the spool, flap 4b is pressed to its closed position by the surface of the film wound on the spool, even when control pin 16b of the succeeding flap is shifted to a position registering with recess 34 formed in cam track 33 of control member 32, and as a result, the control pin is not shifted outward into engagement with the cam face of recess 34. Consequently, takeup indicating member 25 always maintains indicator 28 to be at an indicating hole 29, since cams 27a through 27c are completely free from being pushed by control pins 16a, 16b and 16c.

If a film is not securely taken up on the spool body, control pin 16a of flap 4a located in its open position at the initial stage of film advance, as described above, is shifted inward under the action of close control cam 36. Even when cam 27a of takeup indicating member 25 is once released, control pin 16b of flap 4b is at this time guided by open control cam 35 in response to the rotation of the spool body to reach a position shifted slightly outwardly where control pin 16b is engageable with succeeding cam 27b of takeup indicating member 25. Consequently, takeup indicating member 25 is once rotated clockwise when first control pin 16a is pushed inward thereby moving indicator 28 into alignment with indicating hole 29 of base plate 2. Since, however, the clockwise rotation of member 25 is stopped by succeeding control pin 16b, takeup indicating member 25 does not reach a position where indicator 28 registers with indicating hole 29. As the film advance continues, takeup indicating member 25 is rotated counterclockwise with cam 27b pushed back by control pin 16b when the control pin is advanced to recess 34 of cam groove 33. This causes takeup indicating member 25 to be reset again to its condition, in which indicator 28 is fully offset from indicating hole 29 of base plate 2. Thus, when the film is not properly taken up on the spool body, indicator 28 of takeup indicating member 25 is not shifted to a position where it is visible through an indicating hole 29 of base plate 2.

Consequently, a photographer can easily ascertain whether or not the film takeup operation is properly performed by checking that a colored indicator 28 is visible through and is positioned in registry with an indicating hole 29, while observing base plate 2 of the spool body during the loading of the camera with a film.

Furthermore, when a film is erroneously directed to the clearance or entrance between the surface of succeeding support 3a, and a succeeding flap 4a, since stepped portion 21 and recess 20 are formed respectively on the support and the flap, and clearance or entrance t is bent by the stepped portion and the recess as shown in FIG. 5, the film leader F cannot be erroneously inserted through clearance t.

Any well known or conventional film rewind operation may be employed for rewinding an exposed film wound on the spool body 1, the film rewind operation gradually unrolling the film from the spool body. As the film is removed from the spool body, flap 4a which overlies the film leader and is positioned at the opening of the film takeup chamber, is shifted to its open position, whereby the film is released from its pressed condition against the support 3 to permit its separation from takeup claw 6. With the film completely rewound, flap 4a located at the opening of the takeup chamber is at the open position, as described above, where the opening of the film insertion path is wide open in readiness for loading a new film, therby facilitating prompt film replacement.

In addition, when the film is completely rewound, takeup indicating member 25 is shifted counterclockwise against the action of spring 30 since cam 27a is pressed by control pin 16a of the flap 4a located at the open position. Therefore, indicator 28, which has been in registry with indicating hole 29 of base plate 2, is shifted to a position fully offset from indicating hole 29, thereby indicating the condition of no film being taken up, as shown in FIG. 6.

In the above described embodiment, takeup claws 6 are located on supports 3a through 3c constituting one face of the film insertion path. Even if, in this case, the film leader is not sufficiently advanced along the film insertion path, the film is pressed into engagement with the support 3 by a respective flap which is closed in response to the film advance operation, so that a film perforation is automatically engaged by takeup claw 6, ensuring prompt and reliable film loading at all times without any special attention.

In addition, a clearance S at the innermost part of the film insertion path, is formed by each of the supports 3a through 3c adjacent to each of the respective flaps in the rotational direction W and center shaft 8 of driven member 5. The clearance S is almost as wide as the thickness of the film, so that the leading edge of the film may be frictionally engaged in clearance S. This prevents the film leader once inserted inside the film insertion path, from escaping therefrom due to the curl of the film or the like, thereby facilitating the film loading operation.

Furthermore, matable stepped portion 21 and recess 20 are formed on the surfaces where supports 3a through 3c are opposed to succeeding flaps 4b, 4c and 4a, respectively, as shown in FIG. 5, to form a sharp bend in clearance t between stepped portion 21 and recess 20, whereby to prevent the film leader from erroneously being inserted into clearance t during a loading operation.

As shown in FIG. 2, it should be noted that cams 37 and 38 are provided on the top face of the peripheral wall of cam groove 33 formed in control member 32, cams 37 and 38 being inclined towards cam groove 33, so that the assembly of the spool body and the control member is facilitaed. That is, when the spool body and the control member are assembled, control pins 16a through 16c of flaps 4 extending through base plate 2 of the spool body are required to be fitted inside cam groove 33 of the control member. Cams 37 and 38 guide the control pins to automatically engage cam groove 33 when the spool body is rotated counterclockwise when placed on the control member during assembly, thereby eliminating any complex manual operation for pressing control pins into engagement with cam groove 33, and at the same time, allowing the rapid assembly of the spool body and the control member.

With the present embodiment, clearance S in the innermost part of the film insertion path Y is delineated by center shaft 8 of driven member 5 and supports 3. However, clearance S may be formed directly by center shaft 8 and the flaps.

Furthermore, with the present embodiment, both clearance S and takeup claw 6 function to engage the film leader. Either clearance S or takeup claw 6, however, may be alternatively provided to make film takeup operation onto the spool possible. In other words, when clearance S alone is formed in the innermost part of the film insertion path with takeup claw 6 omitted, a film is held by the opposing clearance faces and is taken up on the spool body. When the film is taken up on the spool body for more than a single turn, it tightly engages the spool body so that the film cannot be removed from the spool. Moreover, when takeup claw 6 alone is provided with clearance S in the innermost part of the film insertion path omitted, the film is pressed by flap 4 onto support 3 even if the film is not held within the film insertion path, thereby allowing the takeup claw 6 to engage a film perforation. As a result, the film is caught by the takeup claw and is advanced to be securely taken up and wound around the spool body.

In accordance with the mechanism of the present invention, an entrance or opening to a film insertion path formed in a takeup spool is widely opened when the spool body is positioned at a predetermined rotational angle. This permits the quicker and easier insertion of the film leader into the film path as compared to the earlier spools whose opening or entrance to the film insertion path is extremely narrow, about equal to the thickness of a film, thereby facilitating film loading.

Figure 8:
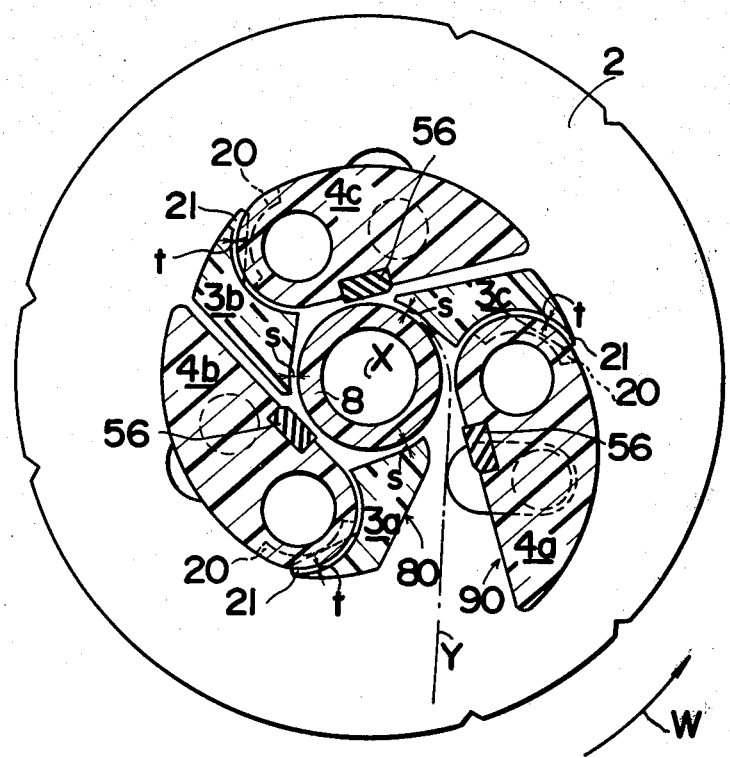
FIG. 8 is a cross-sectional view similar to FIG. 4 of another embodiment of the present invention.

In the embodiment described above, takeup claw 6 is provided to prevent the release and withdrawal of the film from film insertion path Y in order to ensure proper film retention. In the embodiment illustrated in FIG. 8, however, takeup claw 6 is replaced by other film holding means. The same reference numbers are used for members corresponding to the first embodiment to avoid the repetition of description. With the first embodiment, supports 3a, 3b and 3c are formed with their surfaces facing the direction of rotation (arrow W) of the spool body being convex. With the present embodiment, however, a flat face or portion 80 is formed on the corresponding part of each support 3, and takeup claws 6 of the first embodiment are omitted. On the other hand, the rear surface of each flap 4a, 4b or 4c is formed with a flat face or portion 90 on which is provided a high friction elastic member 56 such as rubber or the like. When the flap is rotated to its closed position, elastic member 56 is located and dimensioned as to approach as close as possible the flat surface 80 of the opposing support or the outer peripheral surface of center shaft 8 and to be pressed thereon. In addition, each film insertion path Y is formed or delineated by one surface defined by flat portion 90 of flap 4 and the peripheral surface of the support 3 opposed to center shaft 8, and the other surface defined by surface 80 of support 3 and the circumferential surface of center shaft 8.

In the operation of the last described embodiment, a film is inserted into film insertion path Y whose entrance is opened wide by flap 4a located at its open position, with the film leader advanced into clearance S at its innermost part. With the film advance operation, the spool body is rotated in the direction of arrow W, and flap 4a, which has been at its open position, is shifted or rotated to its closed position to close the opening or entrance of film insertion path Y, in a similar manner to the first embodiment. With flap 4a shifted to its closed position, the film inserted along film insertion path Y is pressed by elastic member 56 against surface 80 of support 3a or the outer peripheral surface of center shaft 8, and is fixed thereon. Consequently, as the film advance operation continues, the film is advanced with its leader film held between elastic member 56 and support 3a or center shaft 8 to be securely and reliably taken up and wound on the spool.

Figure 9:
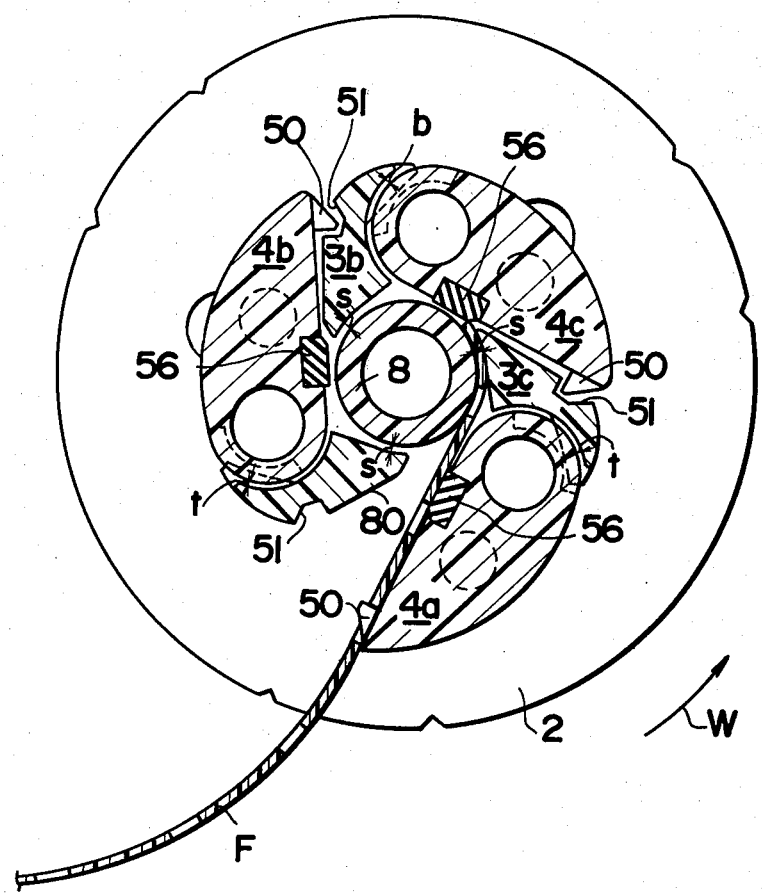
FIG. 9 is a cross-sectional view similar to FIG. 7 of still another embodiment of the present invention.

FIG. 9 illustrates still another embodiment of the present invention differing from those earlier described, primarily in that the film leader is more firmly secured in place to the spool body. Specifically, integrally provided at the tip of each flap is a claw 50 engageable with a perforation in the film, and on the other hand, a well or recessed portion 51 is formed in the peripheral surface 80 of each support, the recess portion being shaped and positioned to be engageable by claw 50. A film F inserted along film insertion path Y receives claw 50 in a perforation therein when flap 4a is shifted to its closed position in response to the film advance operation, as described above. Even if a force should occur to draw the film out of film insertion path Y against its retention by elastic member 56, claw 50 would prevent the full withdrawl of the film. With the above construction, it is possible to securely hold the film on the spool body by only elastic member 56 when film F is sufficiently inserted along the film insertion path. When, however, the film leader is not secured in place due to inadvertence, the above construction is particularly effective in ensuring the retention of the film when, for example, the film leader does not reach elastic member 56 or when the film leader reaches elastic member 56 only to a limited extent.

Figure 10:
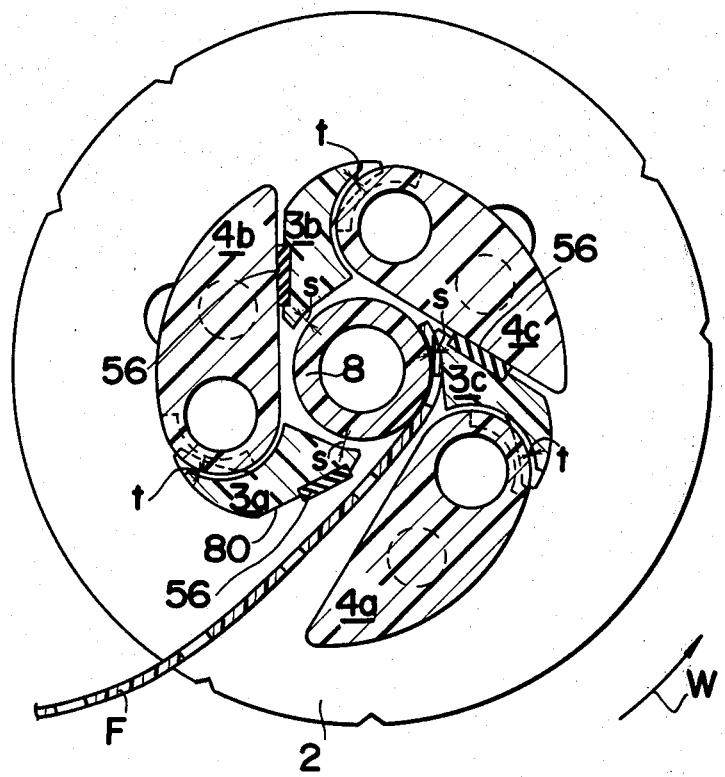
FIG. 10 is a cross-sectional view similar to FIG. 7 of a further embodiment of the present invention.

It should be understood that while in the above embodiments, elastic members 56 are provided on flaps 4 in order to frictionally retain the film leader. The present invention is not limited thereto. On the contrary, an elastic member 56 may be positioned on support 3, i.e., on the peripheral surface 80 of each support 3 as shown in FIG. 10, so that the retention of the film by an elastic member in a manner similar to that of the earlier embodiments is effected.

In addition, the greater the contact area of elastic member 56, the higher the film retention force is. When part of elastic member 56 is shaped and positioned to engage the perforated portion of the film, part of elastic member 56 is elastically transformed to fit into the perforation when pressed against the film, thereby further ensuring the retention of the film.

As in the above embodiment, an elastic member is provided inside a film insertion path, and one of the wall surfaces constituting the film insertion path is defined by a movable member which is used to press the film placed inside the film insertion path against the elastic member during the film loading operation, so that the film leader is retained by the elastic frictional force of the elastic member. According to the present invention, therefore, the film leader need only be inserted into a film insertion path during film loading. This eliminates any adjustment or manipulation of the film insertion position to match a takeup claw and a film perforation position essential in prior art spools which hold the film leader only by using a takeup claw fittable into the film perforation, thereby facilitating rapid film loading.

While there have been described and illustrated preferred embodiments of the present invention, it is apparent that numerous alterations, omissions and additions may be made without departing from the spirit thereof.

We claim:

1. A camera film takeup spool mechanism comprising:
  a body member rotatable about a longitudinal axis peripherally past a predetermined film delivery position and including a pair of jaw members having confronting faces delineating a film passageway, said jaw members being relatively transversely movable between an open position providing a relatively wide entry opening to said film passageway such that said film passageway delineating faces converge at the passageway end remote from said entry opening and a closed position providing a relatively narrow opening such that film is held between said jaw members;
  shifting means responsive to the angular position of said body member for shifting one of said jaw members to said closed position when said body member is displaced from a predetermined position and for shifting said jaw members to said open position when said body member is at said predetermined position; and
  engaging means for providing, at the interior of said film passageway, a predetermined clearance and frictionally engaging a film leader traversing said film passageway and inserted in said clearance.

2. The mechanism of claim 1 wherein said predetermined clearance is of a width approximately equal to the film thickness.

3. The mechanism of claim 1 wherein a first of said jaw members is swingable about a longitudinal axis between jaw entry open and closed positions and the second of said jaw members is stationary on said body member.

4. An easy loading mechanism as set forth in claim 3, wherein said control means includes biasing means for biasing said flap members toward their fully open positions and cam means for moving said flap members against said biasing means.

5. The mechanism of claim 2 wherein said engaging means includes a wall of the second of said jaw members.

6. The mechanism of claim 3 comprising a plurality of peripherally spaced pairs of said jaw members.

7. The mechanism of claim 6 including spring means resiliently biasing each of said first jaw members toward its open position.

8. The mechanism of claim 7 including a film perforation engaging tooth projecting from one of each pair of said film passageway delineating faces.

9. The mechanism of claim 8 wherein said tooth projects from said second jaw member face proximate said passageway entry opening toward said first jaw member.

10. The mechanism of claim 7 comprising a friction pad positioned on one of each pair of said film passageway delineating faces and confronting the other of said faces.

11. The mechanism of claim 10 wherein said friction pad is elastomeric and compressed between said passageway delineating faces in the jaw closed position.

12. The mechanism of claim 7 wherein said shifting means includes a stationary circular cam coaxial with said body member and followers projecting from each of said swingable jaw members into operative engagement with said cam.

13. The mechanism of claim 7 comprising condition indicating means including a member movable between visually distinguishable first and second positions and means responsive to all of said movable jaw members being in closed positions for shifting said indicator member to its first position and responsive to any one of said first jaw members being in its open position for shifting said indicator to its second position.

14. The mechanism of claim 7 wherein said body member includes a circular base, a coaxially spaced circular coupling head and a shaft coaxial with and extending between and integrally rotatable with said base and head, said jaw member pairs being coaxially arranged about to said shaft.

15. The mechanism of claim 14 wherein the peripheral face of said shaft and the confronting inside faces of said second jaw members are spaced along at least a part thereof, a distance about equal to the thickness of the film and defining inner ends of said film passageways.

16. An easy loading mechanism for cameras, comprising:
a takeup spool body member having a film insertion path into which a film leader is inserted, said takeup spool body member being rotatable about a predetermined axis;
a flap member having a face delineating one side of said film insertion path, said flap member being movable between an open position effecting a relatively wide entrance opening to said film insertion path such that said film insertion path contracts approaching its end remote from said entrance and a closed position effecting a relatively narrow entrance opening to said film insertion path, said flap member being supported by said takeup spool body member so as to be rotated therewith about said predetermined axis;
control means for maintaining said flap member at its closed position and moving said flap member from its closed to open position when said takeup spool body member is rotated to a predetermined angular position; and
engaging means for providing, at the inner part of said film insertion path, a limited clearance and frictionally engaging a film leader traversing said path and inserted in said limited clearance.

17. An easy loading mechanism as set forth in claim 16, further comprising at least one more flap member having a similar construction and function as that of said flap member, and wherein said control means moves only one of said flap members which is positioned at said predetermined angular position to its open position and maintains the other flap members at their closed position.

18. An easy loading mechanism as set forth in claim 16, further comprising an indicating means rotatable about said predetermined axis between a first position for indicating that a film is not wound on said takeup spool body member and a second position for indicating that a film is securely wound on said takeup spool body member, and an indication control means for moving said indicating member in accordance with the position of said flap member so that said indicating member is positioned in its first position when said flap member is in its open position and that said indicating member is positioned in its second position when said flap member is in its closed position.

19. An easy loading mechanism as set forth in claim 16, further comprising an elastic member provided on a side face delineating said film insertion path in cooperation with an opposing side face, said elastic member being capable of pressing against said opposing side face when said flap member is positioned at its closed position.

20. An easy loading mechanism as set forth in claim 19, further comprising a claw provided in the vicinity of the entrance of said film insertion path, said claw having a configuration engageable with a film perforation.

* * * * *